United States Patent
Ramani et al.

(10) Patent No.: US 7,823,063 B2
(45) Date of Patent: Oct. 26, 2010

(54) DELAYED LOADING AND INSTANTIATION OF RESOURCES DEFINED IN MARKUP

(75) Inventors: Sundaram Ramani, Redmond, WA (US); Benjamin F. Carter, Redmond, WA (US); Peter F. Ostertag, Woodinville, WA (US); Patricia Ostertag, legal representative, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 1142 days.

(21) Appl. No.: 11/273,780

(22) Filed: Nov. 15, 2005

(65) Prior Publication Data

US 2007/0169011 A1    Jul. 19, 2007

(51) Int. Cl.
*G06F 17/00* (2006.01)
*G06F 9/45* (2006.01)

(52) U.S. Cl. .................. 715/239; 715/234; 717/140
(58) Field of Classification Search .............. 717/114, 717/136–151, 166, 100, 140; 715/200–277, 715/234, 239
See application file for complete search history.

(56) References Cited

U.S. PATENT DOCUMENTS

| | | | |
|---|---|---|---|
| 2004/0073541 A1* | 4/2004 | Lindblad et al. | 707/3 |
| 2004/0172596 A1* | 9/2004 | Ramani et al. | 715/513 |
| 2005/0091672 A1* | 4/2005 | Debique et al. | 719/328 |
| 2006/0031918 A1* | 2/2006 | Sarachik et al. | 725/138 |
| 2006/0070044 A1* | 3/2006 | Romanovski et al. | 717/136 |
| 2006/0117061 A1* | 6/2006 | Weiss | 707/104.1 |
| 2006/0288276 A1* | 12/2006 | Odagiri et al. | 715/513 |

OTHER PUBLICATIONS

Xavier Pacheco et al., "Delphi 5 Developer's Guide", 1999, Sams, section: Working with Memory-Mapped Files.*

* cited by examiner

*Primary Examiner*—Wei Y Zhen
*Assistant Examiner*—Chung Cheng

(57) ABSTRACT

Techniques for delayed loading and instantiation of resources in a resource dictionary are provided. These techniques can be used to delay or defer the loading of values (or "value records") into the resource dictionary until the values are actually needed or requested by an application.

17 Claims, 9 Drawing Sheets

| | | |
|---|---|---|
| AssemblyInfo 0 | "PresentationFramework" | (TA) |
| TypeInfo 0 in Assembly 0 | "ResourceDictionary" | (TA) |
| ElementStart on Type 0 | | (DB) |
| XmlnsDefinitionProperty "x" Definition | | (DB) |
| TypeInfo 1 in Assembly 0 | "ClassOne" | (TA) |
| ElementStart of Type 1 | | (DV) |
|    DefAttributeKeyString | "Key1" | (DK) |
|    AttributeInfo 0 on Type 1 | "PropertyOne" | (TA) |
|    Property of AttributeInfo 0 | "ValueOne" | (DV) |
| ElementEnd | | (DV) |
| ElementStart of Type 3 | | (DV) |
|    TypeInfo 2 in Assembly 0 | "ClassTwo" | (TA) |
|    DefAttributeKeyType of Type 2 | | (DK) |
|    ElementStart of Type 2 | | (DV) |
|    ElementEnd | | (DV) |
| ElementEnd | | (DV) |
| ElementEnd | | (DB) |

304
305
301
302
306
315
311
307
316
317
318
308
312
319
320
321
322

300

Type and Attributes (TA)

Dictionary Bounds (DB)

Dictionary Keys (DK)

Dictionary Values (DV)

FIG. 3

APIs used to set deferrable content on a ResourceDictionary are:

```
                                            ~ 801
    internal void SetDeferableContent(
        byte[]      buffer,      ~ 802
        ParserContext context,   ~ 806
        object      rootElement,
        ArrayList   keyCollection)
                                 ~ 808
                ?
                  810

801
                                   /
    internal void SetDeferableContent(   ~ 803
        Stream      bamlStream,
        Int64       startPosition,  ~ 804
        Int32       contentSize,    ~ 805
        ParserContext context,   ~ 806
        object      rootElement,  ~ 808
        ArrayList   keyCollection)
                  \ 810
```

DELAYED LOADING AND INSTANTIATION OF RESOURCES DEFINED IN MARKUP

BACKGROUND

Markup documents have simplified the creation of resources while at the same time improving their usability. Markup languages, such as extensible markup language (XML), are relatively easy to understand, which makes the creation of markup documents relatively simple. The use of XML technology has expanded beyond browser applications to database, operating system and other applications.

In many applications, much of the code pertains to creating and updating the User Interface (UI) of the application. Recently, many developers have learned to write (and some developers prefer to define) an application's UI by using markup languages, such as XML-based markup languages, etc. One example of an XML-based markup language is the "Extensible Application Markup Language (XAML)." XAML is a declarative programming model which maps XML markup to objects. XAML provides a consistent model for object construction, which can allow programmers to encode operating system, application and other elements in an object-rooted hierarchical format. XAML is especially useful for implementing an application's UI since XAML separates UI design from the underlying code. XAML allows a UI to be declaratively represented or specified as a hierarchy of objects with properties and logic. This enables graphical designers to create compelling, highly refined user interfaces, while allowing developers to focus on the application logic.

XML-based representations of documents or objects are typically larger than other formats, such as binary files or others. As such, XML/XAML-based data may demand significant amounts of time to load onto a client machine or download over a network. Techniques which make the XML/XAML-based platforms more efficient in storage and reduce application load times are highly desirable. To help achieve this, at compilation-time, XAML can be compiled into a binary representation of the XML.

In one resource model, a presentation framework has objects with a Resources property that can refer to resources in large files that contain resource dictionaries (RDs). A resource dictionary (RD) can include various resources which are defined in markup. In this context, the term "resource" refers to a way of reusing commonly defined objects and values. RDs allow developers to create one instance of a piece of data, in either markup or code, and re-use that data by referring to it from one or more locations within an element tree. RDs are used to store large amounts of data in random access memory (RAM) that may not be needed or used immediately. When a RD is specified, the entire RD and all resources in that RD would be created or "instantiated" at the same time. Instantiating and loading all of this data into RAM unnecessarily consumes valuable space in the memory and can, for example, increase application startup time.

SUMMARY

Techniques for delayed the loading and instantiation of resources in a resource dictionary are provided. These techniques can be used to defer or delay the loading of values (or "value records") into the resource dictionary until the values are actually needed or requested by an application. According to these techniques, key information can be read into the resource dictionary at load-time, and loading of the values into the resource dictionary can be delayed until an application requests the values.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments will be described in conjunction with the following drawing figures, wherein like numerals denote like elements.

FIG. 3 shows an example of binary records stored in a typical binary representation of the XAML file/stream formatted according to techniques;

FIG. 8 shows Application Programming Interfaces (APIs) used to set deferrable content on a resource dictionary.

DETAILED DESCRIPTION

The following detailed description is merely exemplary in nature and is not intended to limit the invention or the application and uses of the invention. Furthermore, there is no intention to be bound by any expressed or implied theory presented in the preceding background, brief summary or the following detailed description.

Loading and Instantiation of Resources

Figure 1:
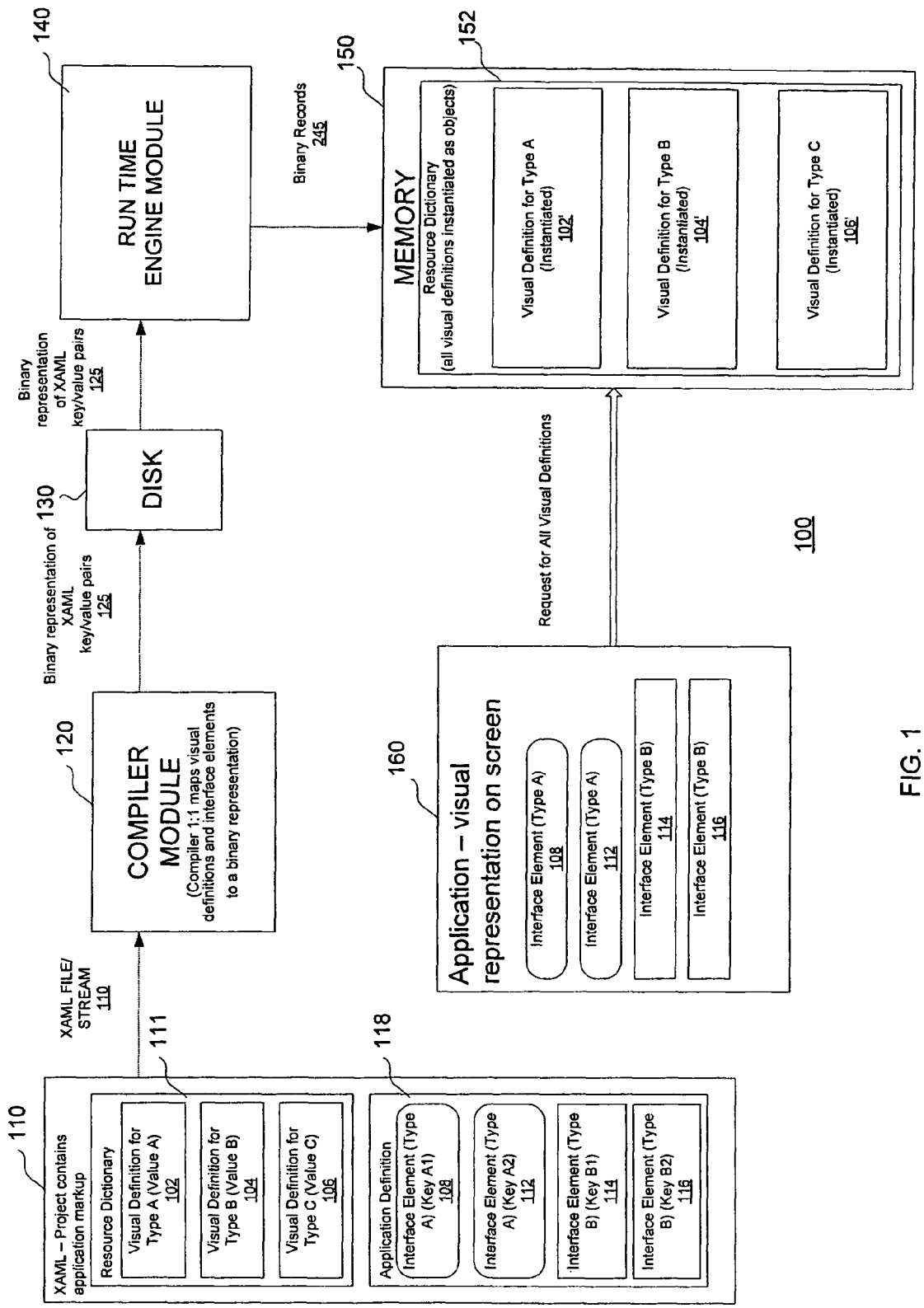
FIG. 1 is a block diagram of a runtime environment.

FIG. 1 is a block diagram of a runtime environment 100 showing the modules involved in retrieving resources from a resource dictionary (RD) 111 when loading an application 160. The runtime environment 100 implements a compiler module 120, a disk 130, a run-time engine module 140, and a memory 150. As will be described below with reference to FIGS. 1-3, all items in the RD 111 are instantiated at the same time. When all items are simultaneously instantiated in RD 152, however, problems, such as, increased memory usage and increased application startup time tend to occur.

In this example, the source or input file is a XAML file/stream 110 including RD 111 and an application definition 118. The source XAML file/stream 110 may be used to represent or generate a set of XAML nodes corresponding to the structure of an object tree (not shown). The object tree may represent, for example, user interface elements such as dialog boxes, icons, buttons, borders or other elements or resources used in operating systems or other code. While the following description describes encapsulating user interface elements, it should be appreciated that the source XAML file/stream 110 may comprise other types of code, data or interfaces.

The RD 111 can include various resources 102-106 which are defined in markup. To define a particular RD 111, a parent chain is marked up as a hierarchy of elements in a given page. An example of XAML markup for a typical RD is shown below in Expression 1.

Expression 1

```
<ResourceDictionary
    xmlns="http://schemas.microsoft.com/winfx/avalon/2005"
    xmlns:x="http://schemas.microsoft.com/winfx/xaml/2005" >
    <ClassOne x:Key="Key1" PropertyOne="ValueOne" />
    <Type35>
      <x:Key><ClassTwo /></x:Key>
    </Type3>
</ResourceDictionary>
```

Each XAML tag corresponds to an object model class. A XAML tag also usually has a collection of attributes that corresponds to the properties of the tag's associated class. Each XAML tag becomes an instance of the corresponding object model class, and the tag's attribute values are assigned to the corresponding object properties.

In this particular example, the resources 102-106 of the RD 111 are different "types" of visual definitions (VDs) 102-106 corresponding to the different "types" of interface elements 108, 112-116 specified in the application definition 118. Each "visual definition" refers to the style, template, and other resources which define what a particular interface element 108, 112-116 looks like. The resources 102-106 can be referenced in a property value, for example, by putting the resource name in braces. Each visual definition can be specified as a "value" of the property. The interface elements 108, 112-116 can be controls such as dialog boxes, icons, buttons, borders or other elements or resources used in operating systems or other code, etc., Each resource 102-106 has a particular key associated with it that can be used to identify the resource within the parent chain. The "type" of each interface element 108, 112-116 can be specified as a "key." To find the resource 102-106 within the RD 111 and apply it, the parent chain is searched for the associated key thereby allowing the resource 102-106 to be found.

A given resource 102-106 is instantiated in memory 150 as an object 102', 104', 106'. The objects 102', 104', 106' are used to store large amounts of data in memory (RAM) 150 that may not be needed or used immediately. For instance, in the system theme, each particular theme has its own RD which might include, for instance, all of the different default styles for each of the controls used in that theme. Each style may require certain resources. As a result, the RD for a particular theme can include large amounts of information. ly when the RD 111 is specified, the entire RD 111 and all resources 102-106 in that RD 111 are created or "instantiated" at the same time. Instantiating and loading all of this data into memory (RAM) 150 unnecessarily consumes valuable space in the memory 150 and can, for example, increase application startup time.

Figure 2:
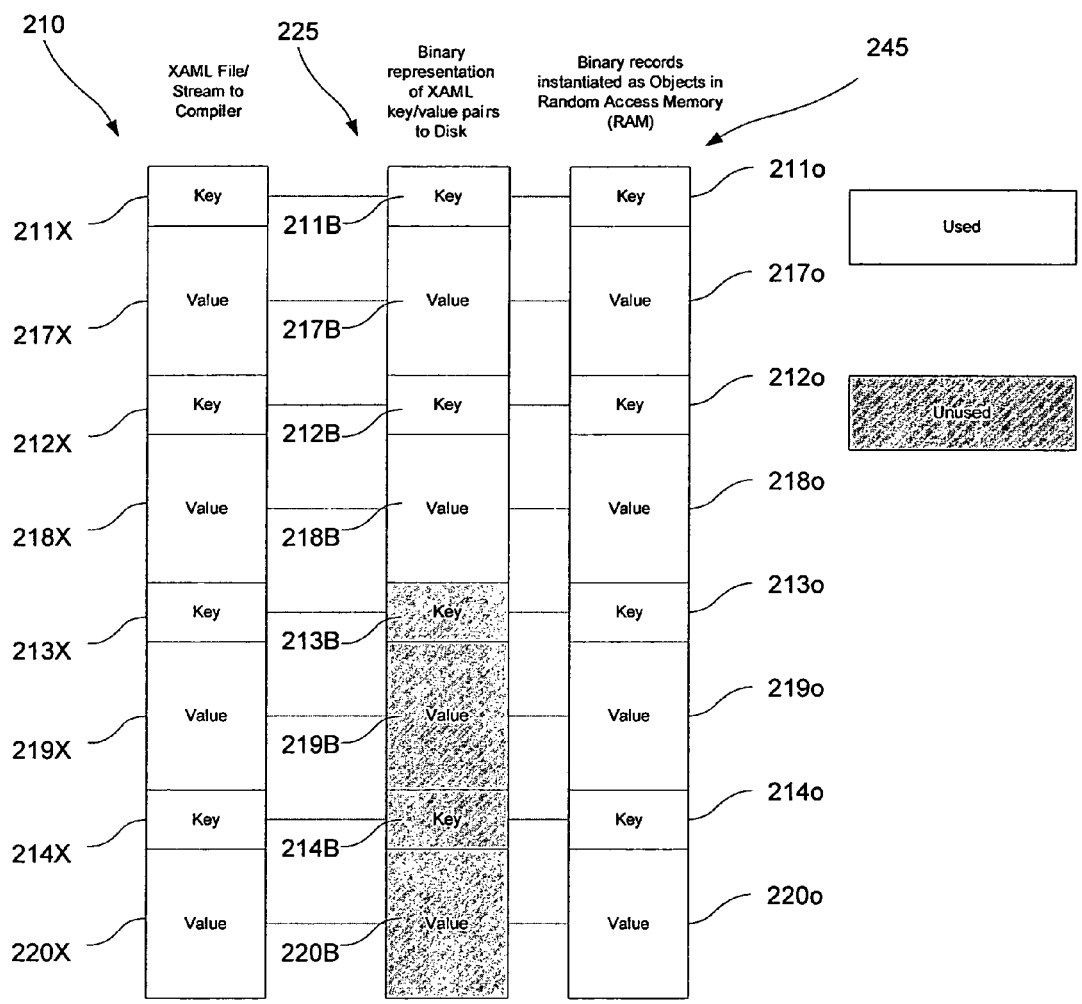
FIG. 2 is a simplified block diagram showing formats of a XAML file/stream, a typical binary representation of the XAML file/stream stored on disk, and corresponding binary records instantiated as objects in Random Access Memory (RAM)

FIG. 2 is a simplified block diagram showing formats of a XAML file/stream 210, a binary representation of the XAML file/stream 225 stored on disk 130, and corresponding binary records 245 instantiated as objects in memory 150.

The XAML file/stream 210 includes a number of key/value pairs 211X/217X, 212X/218X, 213X/219X, 214X/220X which are sent to markup compiler module 120. In the XAML file/stream 210, each key and its corresponding value are arranged sequentially so that consecutive XAML key/value pairs are arranged in an alternating format (e.g, key 1, value 1, key 2, value 2, etc.).

At compilation-time, the compiler module 120 detects the incoming XAML file/stream 110/210, and compiles the incoming XAML file/stream 110/210 into a corresponding binary representation 125/225. The compiler module 120 encapsulates the information characterizing the object tree in binary form to produce the binary representation of the XAML file/stream 125/225. In this example, as shown in the second column of FIG. 2, the compiler module 120 receives the XAML file/stream 110/210 and maps (1:1) the XAML key/value pairs 211X/217X, 212X/218X, 213X/219X, 214X/220X into a binary representation of the XAML file/stream 225 including a number of binary key/value pairs 211B/217B, 212B/218B, 213B/219B, 214B/220B. For sake of clarity, the simplified representation of the formats of the binary stream 125/225 and corresponding binary records 211B-220B in FIG. 2 show only the relative position of keys with respect to values. In actual implementations, however, it should be appreciated that the binary stream 125/225 and corresponding binary records 211B-220B would also include other information and records, as will be described below with reference to FIG. 3.

The XAML file/stream 110/210 has a "first file format" the arrangement of which is substantially identical to a "second file format" of the binary file 125/225. In other words, the arrangement of the XAML key/value pairs 211X/217X, 212X/218X, 213X/219X, 214X/220X is identical to that of the binary key/value pairs 211B/217B, 212B/218B, 213B/219B, 214B/220B (e.g, key 1, value 1, key 2, value 2, etc.).

Each binary key 211B-214B and its corresponding binary value 217B-220B are stored sequentially (in sequential order) on disk 130 as binary data. The binary key/value pairs 213B/219B and 214B/220B represent binary key/value pairs within the object tree which are not currently being used by the application module 160.

At load-time, the run-time engine 140 reads the binary key/value pairs 211B/217B, 212B/218B, 213B/219B, 214B/220B from disk 130.

At run-time, the run-time engine 140 interprets the sequential binary data as binary key records 211X-214X and binary value records 217X-220X, and loads the binary records 211B/217B, 212B/218B, 213B/219B, 214B/220B into memory 150 where the binary records 211B/217B, 212B/218B, 213B/219B, 214B/220B are instantiated as objects 211o/217o, 212o/218o, 213o/219o, 214o/220o. As shown in column 245 of FIG. 2, the binary key objects 211o-214o and the binary value objects 217B-220B are arranged in memory 150 in the same order that the binary key/value pairs 211B-220B are stored on the disk 130.

Notably, all of the binary records 211B-220B are instantiated in memory 150 when the markup document is loaded. Thus, although the binary key/value pairs 213B/219B and 214B/220B are not currently being used, the key/value pairs 213B/219B and 214B/220B are nevertheless instantiated in memory 150 as objects 213o/219o and 214o/220o. This can be extremely inefficient especially when a particular visual definition corresponding to a particular value 219X, 220X is not presently being used by an application since it can waste memory capacity and slow application start up times.

FIG. 3 shows an example of binary records 301-322 which might be stored in a typical binary representation of the XAML file/stream 300. As shown, in addition to dictionary key (DK) information or records 311, 312 and dictionary value (DVs) information or records 315-321, a typical binary file 300 might have a number of other records including type and attribute (TA) information or records 304-308, and dictionary element bounds (DB) information or records 301, 302, 322.

The AssemblyInfo record 304 specifies the full name (or "strong name") of an assembly "PresentationFramework" whose types will be used in the binary stream. When the "PresentationFramework" assembly is loaded it contains Types used in the construction of an object tree. The TypeInfo records 305, 306, 308 specify the full name of the type of an object (or "type names"), with a reference to the Assembly record where it is defined. For example, the TypeInfo 0 record 305 specifies the full name "ResourceDictionary," the TypeInfo record 1 306 specifies the full name "ClassOne," and the TypeInfo record 2 308 specifies the full name "ClassTwo." The AttributeInfo record 307 specifies the full name of an attribute, or property, on an object, with a reference to the Type record that defines this attribute, and the type record that defines the type of the property. In this example, AttributeInfo record 307 specifies the full name of a property ("Propertyone") that is to be set on an object, with a reference to the Type 1 record that defines this attribute, and the type record that defines the type of "PropertyOne."

The dictionary element bounds (DB) records 301, 302, 322 are structure records which contain information about the object tree structure, and make references to the info records for specific types and attributes. The ElementStart on Type 0 record 301 indicates the start of a root object in the XAML file/stream, whereas the ElementEnd record 322 indicates the end of the root object in the XAML file/stream. The XmlnsDefinitionProperty record 302 specifies information about an xmlns declaration encountered in a XAML file.

The ElementStart of Type 1 record 315 specifies that an object of Type 1 (ClassOne) should be instantiated. The DefAttributeKeyString record 311 specifies the key for the key/value pair, associating "Key1" with the object instantiated by 315. The Property of AttributeInfo 0 record specifies the value for the property specified in 307 (Propertyone="ValueOne"). The ElementEnd record 317 is a scope delimiter, indicating that the parser is done interacting with the object created by 315 and will be moving on to whatever is next. The ElementStart of Type 3 record 318 specifies that an object of type 3 should be instantiated. A set of types within PresentationFramework are pre-defined with numbers so that they don't have to be duplicated in all binary files. The DefAttributeKeyType of Type 2 record 312 is the key associated with the object instantiated by 318. Unlike the key defined in 311, the key in the DefAttributeKeyType of Type 2 record 312 is not a string but of the type defined by 308 (ClassTwo). Since the key is not a string the ElementStart of Type 2 record 319 indicates that an object of type 2 (ClassTwo) should be instantiated, and the ElementEnd record 320 ends the scope defining that object. The ElementEnd record 321 ends the scope defining the object started in 318.

The compiler module 120 interleaves or interposes the type and attribute (TA) information 304-308 and dictionary element bounds (DB) information 301, 302, 322 with key records (DK) 311, 312, and value records (DV) 315-321 in the binary file 300. Consequently, type and attribute records (TA) 304-308, key records (DK) 311, 312, and value records (DV) 315-321 are not arranged or sorted in any particular order.

Exemplary Implementations

As used herein, the word "exemplary" means "serving as an example, instance, or illustration." Any implementation described herein as "exemplary" is not necessarily to be construed as preferred or advantageous over other implementations. All of the implementations described below are exemplary implementations provided to enable persons skilled in the art to make or use the invention and are not intended to limit the scope of the invention which is defined by the claims.

Exemplary Computing Environment

Figure 4:
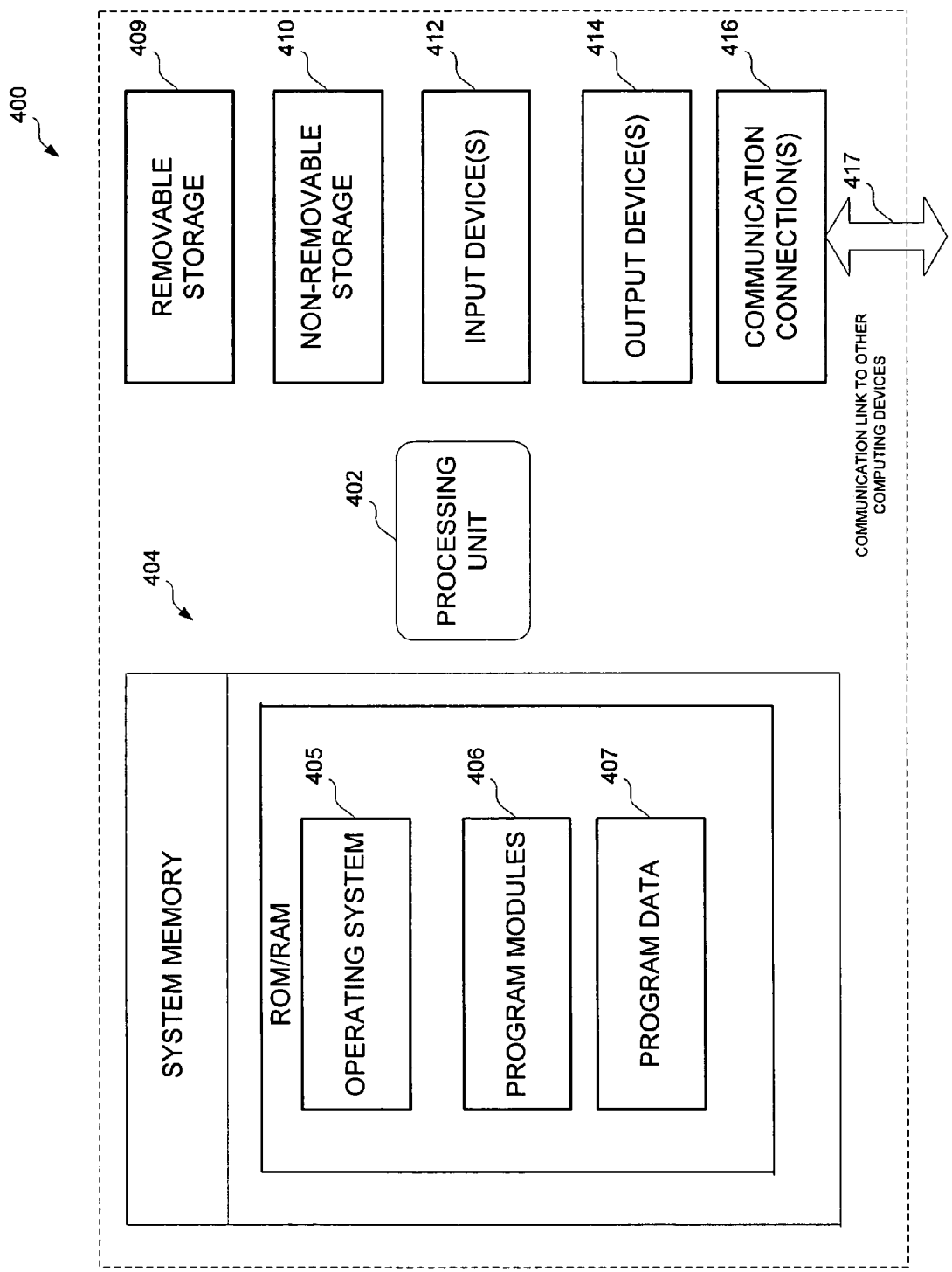
FIG. 4 illustrates an exemplary computing device that may be used in exemplary implementations.

FIG. 4 illustrates an exemplary computing device 400 that may be used in exemplary implementations. The computing device 400 includes at least one processing unit 402, system memory 404, removable storage 409, non-removable storage 410, input device(s) 412, output device(s) 414, and communication(s) connection(s) 416 to other computing device(s) (not shown). Hardware, software or other resources described as singular may in embodiments be distributed, and resources described as distributed may be combined.

The processing unit 402 may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processing unit 402 may also be implemented as a combination of computing devices, e.g., a combination of a DSP and a microprocessor, a plurality of microprocessors, one or more microprocessors in conjunction with a DSP core, or any other such configuration.

Computer storage media may include volatile and nonvolatile, removable and non-removable media implemented in any method or technology for storage of information, such as computer readable instructions, data structures, program modules, or other data. System memory 404, removable storage 409 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of device 400. Depending on the exact configuration and type of computing device, system memory 404 may be volatile (such as RAM), non-volatile (such as ROM, flash memory, etc.) or some combination of the two. System memory 404 includes an operating system 405, one or more program modules 406, and may include program data 407. Examples of program modules 406 include a browser application, a finance management application, a word processor, and the like. Additional data storage devices, such as removable storage 409 and/or non-removable storage 410, can include, for example, magnetic disks, optical disks, or tape.

Input device(s) 412 may include, for example, a keyboard, a mouse, a pen, a voice input device, a touch input device, etc. Output device(s) 414 such as a display, speakers, printer, etc. may also be included.

Communication connections 416 are one example of communication media which allow the computing device 400 to communicate with other computing devices (not shown), such as over a network, over a wired or wireless communications link 417. Communication media may be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 5:
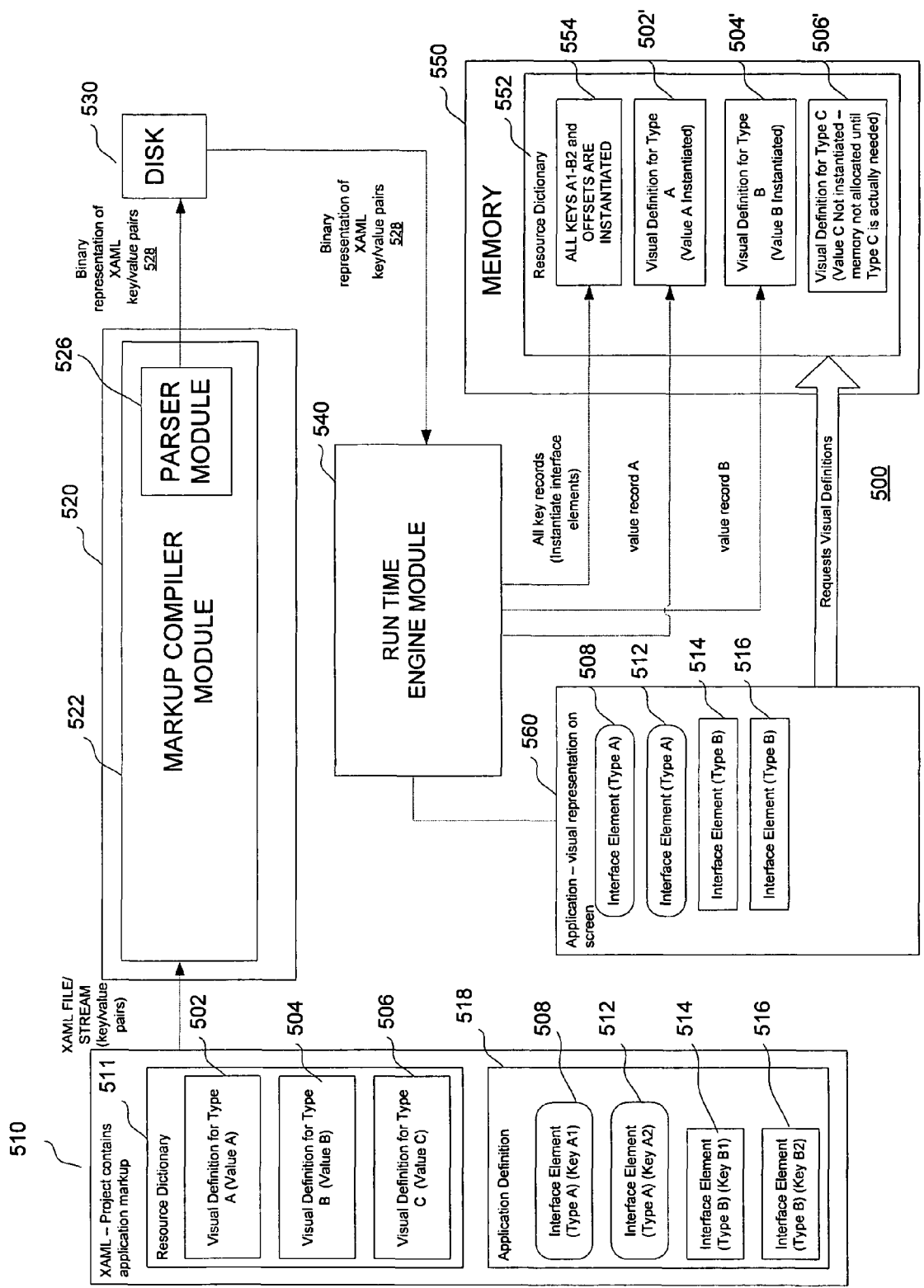
FIG. 5 is a functional block diagram generally illustrating a markup execution environment for instantiating value records in a memory as requested by an application module according to an exemplary implementation.

FIG. 5 is a functional block diagram generally illustrating a markup execution environment 500 for instantiating value records in a memory 550 as requested by an application module 560 according to an exemplary implementation. The system comprises a mapping engine 520 including a markup compiler module 522 and a parser module 526, a disk 530, a run-time engine 540, a memory 550, and an application module 560.

Compile Phase

In this particular implementation, the markup compiler 522 receives an Extensible Application Markup Language (XAML) file/stream 510 which comprises a resource dictionary (RD) 511 and an application definition 518. Although the foregoing description uses an XAML file/stream 510 as an example of an input to the markup compiler 522, it should be appreciated that the input to the markup compiler 522 could generally comprise other types of markup documents including other extensible markup language (XML)-based documents. Moreover, the input to the markup compiler 522 can generally comprise markup language information comprising keys and corresponding values for each key.

The source XAML file/stream 510 may be used to represent a set of XAML nodes corresponding to the structure of an object tree (not shown) which represents, for example, user interface elements 508, 512, 514, 516 such as dialog boxes, icons, buttons, borders or other elements or resources used in operating systems or other code. While the following example describes XAML nodes which correspond to interface elements 508, 512, 514, 516, it should be appreciated that the source XAML file/stream 510 may comprise other types of code, data or interfaces.

The RD 511 represents a tree of elements that can include various resources 502-506 which are defined in markup. To define a particular RD 511, a parent chain is marked up as a hierarchy of elements in a given page. In this particular example, the resources 502-506 of the RD 511 are different "types" of visual definitions (VDs) 502-506 corresponding to the different "types" of interface elements 508, 512-516 specified in the application definition 518. Each "visual definition" refers to the style, template, and other resources which define what a particular interface element 508, 512-516 looks like. The resources 502-506 can be referenced in a property value, for example, by putting the resource name in braces. Each visual definition can be specified as a "value" of the property. The interface elements 508, 512-516 can be controls such as dialog boxes, icons, buttons, borders or other elements or resources used in operating systems or other code, etc. Each resource 502-506 has a particular key associated with it that can be used to identify the resource 502-506 within the parent chain. The "type" of each interface element 508, 512-516 can be specified as a "key." To find the resource 502-506 within the RD 511 and apply it, the parent chain is searched for the associated key thereby allowing the resource 502-506 to be found.

The XAML file/stream 510 comprises markup information which includes tags (not shown) that define the elements of the markup-based page or application, the keys (e.g., interface element 508, 512-516 types) and the corresponding values (e.g., visual definitions 502, 504, 506) for each key. The XAML file/stream 510 has a first format as will be described below with reference to FIG. 6.

Each tag corresponds to an object model class. Each tag also usually has a collection of attributes that corresponds to the properties of the tag's associated class. Each tag becomes an instance of the corresponding object model class, and the tag's attribute values are assigned to the corresponding object properties.

The markup compiler module 522 and parser module 526 can be implemented as a software module, such as program module 406 shown in FIG. 4. In FIG. 5, the functionality provided by the parser module 526 is shown as being provided within markup compiler 522. In another embodiment, the functionality provided by the parser module 526 may be provided as a separate module or component. The markup compiler module 522 and parser module 526 can be implemented using a software module which compiles the XAML into binary. When instructed to compile the XAML file/stream 510, the markup compiler 522 examines the tags and compiles the XAML file/stream 510 to generate a binary representation of the XAML file/stream 528 which is described below with reference to FIG. 6. In the example, the file/stream 528 generally comprises a binary representation of the XAML information; however, it should be appreciated that the binary representation of the XAML file/stream 525 may alternatively comprise a tokenized binary stream of information based on the markup text within the XAML file/stream 510. The markup complier module 522 receives the XAML file/stream 510, calls the 526, and passes the XAML file/stream 510 to the 526.

The parser module 526 receives the XAML (text) records of the XAML file/stream 525, converts (tokenizes) them into binary records, and generates a modified binary representation of the XAML file/stream 528. The modified binary representation of the XAML file/stream 528 comprises binary key records, binary value records, and offsets from each binary key record to its corresponding binary value record. The modified binary representation of the XAML file/stream 528 has a binary record format as will be described below with reference to FIG. 6. The parser module eventually writes the binary records of the modified binary representation of the XAML file/stream 528 to disk 530.

The parser module 526 includes, among other things, an interpreter sub-module (not shown) for classifying each XAML record of the XAML file/stream 510, buffer sub-modules (not shown) and an assembly sub-module (not shown). To begin generating modified binary representation of the XAML file/stream 528, when the parser module 526 encounters a start tag for the RD 511, the interpreter sub-module examines and classifies each XAML record in the XAML file/stream 510. The parser module converts or tokenizes each XAML key record into a corresponding binary key record, and converts or tokenizes each XAML value record into a corresponding binary value record. The parser module 526 begins buffering binary key records and binary value records into separate buffer sub-modules. For instance, the parser module 526 can buffer the binary key records in a first buffer sub-module (not shown), and can buffer the corresponding binary value records in a second buffer sub-module (not shown). The parser module 526 also generates and stores offset values or "offsets" from each binary key record to each corresponding binary value record. As will be described below, the "offsets" can eventually be used to locate binary value records which correspond to particular binary key records. The offsets specify the location of each binary key record with respect to its corresponding binary value record.

Once an end tag of the RD 511 is encountered, the parser module 526 stops buffering, and the assembly sub-module arranges the binary key records, the offsets, and the corresponding binary value records into the binary record format of the modified binary representation of the XAML file/stream 528. In one implementation, as will be described below with reference to FIG. 6, the binary record format of the modified binary representation of the XAML file/stream 528 comprises a first portion comprising binary key records and offsets, and a second portion comprising the binary value records. The assembly sub-module builds the modified binary representation of the XAML file/stream 528 such that the first portion precedes the second portion so that second portion can be loaded and instantiated in the resource dictionary after the first portion. This way the binary key records and offset information can be stored in a contiguous section at the front of the RD 511. This format allows the binary key records and offsets to be instantiated in the memory 550 at load-time, while allowing the instantiation of the binary value records in the memory 550 to be deferred to a later time when the application module 560 requests particular binary value records. In one arrangement of the modified binary representation of the XAML file/stream 528, the offsets can be interleaved with the binary key records such that the offsets are interposed between the binary key records. This way binary key record/offset pairs can be processed together in a sequential manner.

The parser module 526 sends the modified binary representation of the XAML file/stream 528 to disk 530 where it can be stored until run-time.

Instantiation Phase

At load-time, the run-time engine 540 receives the modified binary representation of the XAML file/stream 528 stored at disk 530, and interprets and converts the binary key records and offsets to code. The run-time engine 540 then loads the binary key records and offsets into the RD 552 in memory 550, where the binary key records are instantiated as key objects.

At run-time, when the application module 560 requests a specific binary value record, the run-time engine 540 determines its corresponding binary key record and a specific offset (corresponding to the specific binary key record). The run-time engine 540 can use the specific offset to locate the specific binary value record. Once located, the specific binary value record requested by the application module 560 can be loaded into and interpreted by the run-time engine 540. The specific binary value record can then be instantiated as a value object in the RD 552 stored in memory 550. For example, the first offset, corresponding to the first binary key record, can be used to locate the first binary value record in response to a request from the application module 560, at run-time, for the first binary value record corresponding to the first binary key record. The first binary value record requested by the application module 560 can be then loaded, interpreted, instantiated in the resource dictionary 552 (stored in the memory 550) as a first value object.

Thus, the resources 502, 504, 506 (e.g., values or binary value records) in the RD 511 are selectively created or "instantiated" as objects 502', 504', 506' in the RD 552 in memory 550 on an "as requested" or "as needed" basis. Selectively loading and instantiating the resources 502, 504, 506 tends to save valuable space in the memory 550 and can, for example, reduce application startup times. By delaying the loading and instantiation of the binary value records in memory 550 until the binary value records are actually needed, valuable space in the memory 550 can be conserved, and application module 560 startup time can be reduced.

As noted above, to implement delayed loading and instantiation of resources (e.g., binary value records) in the RD 552, an alternate arrangement, format or packing of the binary value records and binary key records can be implemented which allows the binary key records to be read into a RD 552 at binary load time, while loading of binary value records into the RD 552 can be delayed or deferred until an application module 560 requests the binary value records.

Figure 6:
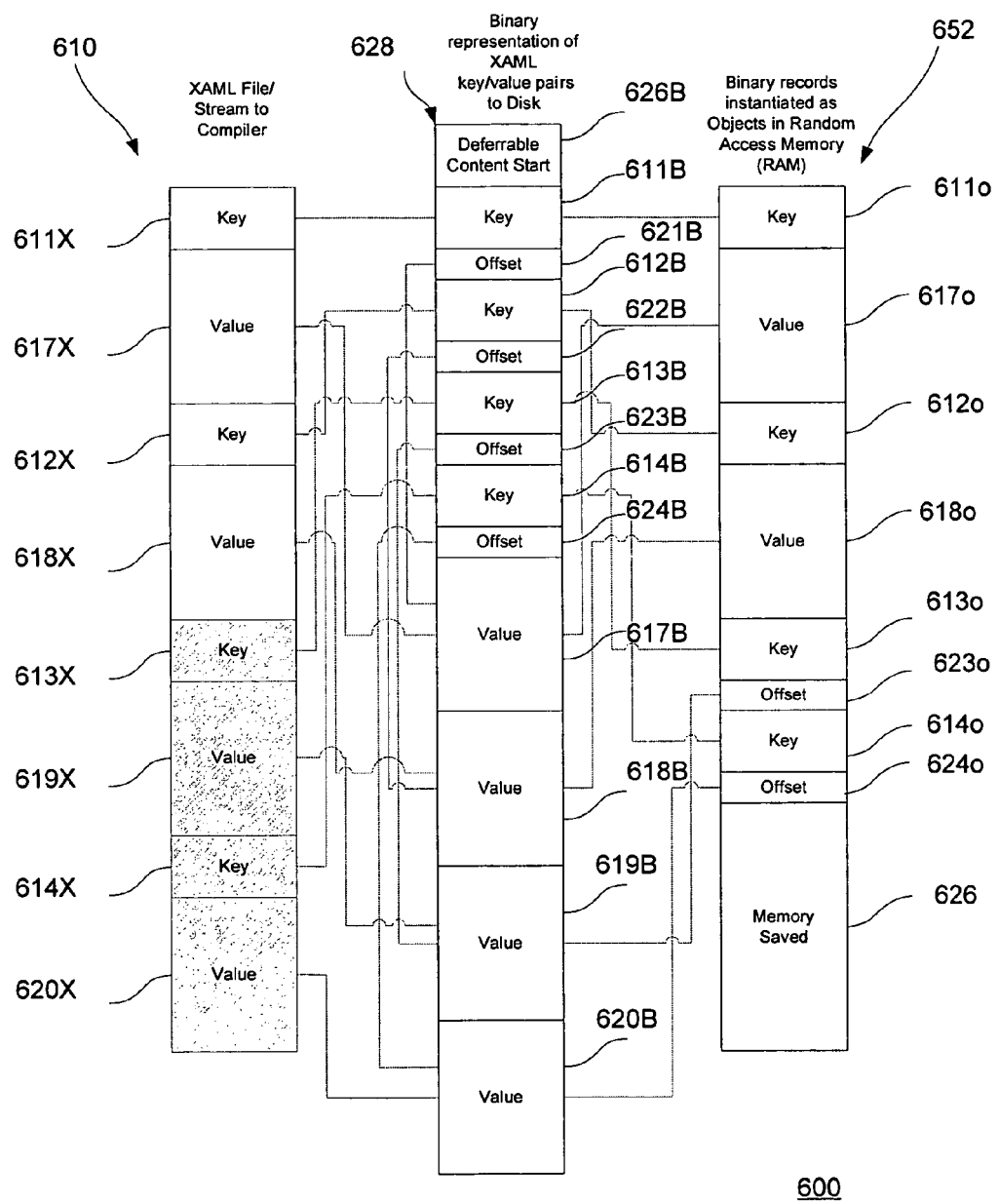
FIG. 6 is a simplified block diagram showing formats of a XAML stream, a modified binary representation of the XAML file/stream stored on disk, and corresponding binary records instantiated as objects in RAM according to an exemplary implementation.

FIG. 6 is a simplified block diagram showing formats of a XAML file/stream 610, a modified binary representation of the XAML file/stream 628 stored on disk, and corresponding binary records 652 instantiated as objects in Random Access Memory (RAM). Although the description describes that the binary or binary representations 628 comprise various records, it should be appreciated that in other implementations the actual binary format may vary. These formats will be described with reference to the modules shown in FIG. 5.

The XAML file/stream 610 includes a number of key/value pairs 611X/617X, 612X/618X, 613X/619X, 614X/620X which are sent to markup compiler module 522. In the XAML file/stream 610, each key and its corresponding value are arranged sequentially so that consecutive XAML key/value pairs are arranged in an alternating format (e.g, key 1, value 1, key 2, value 2, etc.).

At compilation-time, the compiler module 522 detects incoming XAML file/stream 510/610, calls the parser module 526 and passes the XAML file/stream 510/610 to the parser module 526. The parser module 526 uses the XAML file/stream 510/610 to generate a modified binary representation of the XAML file/stream 528/628. The binary XAML stream/file 528/628 encapsulates the information characterizing the object tree in binary form. In this example, as shown in the second column of FIG. 6, the compiler module 522 receives the XAML file/stream 510/610 and passes the XAML key/value pairs 611X/617X, 612X/618X, 613X/619X, 614X/620X to the parser module 526 which recompiles them to generate the modified binary representation of the XAML file/stream 528/628. The parser module 526 can also add a deferrable content record 626B at the beginning of the binary stream 628 to provide a mechanism for designating the values as deferrable content. For sake of clarity, the simplified representation of the formats of the binary stream 528/628 and corresponding binary records 611B-620B in FIG. 6 show only the relative position of keys with respect to values. In actual implementations, however, it should be appreciated that the binary stream 528/628 and corresponding binary records 611B-620B can also include other information and records, as will be described below with reference to FIG. 7.

As shown in FIG. 6 the format (e.g., arrangement and content) of the binary stream/file 628 stored on the disk 130 is considerably different than that shown in FIG. 2. The binary stream/file 628 separates the binary key records 611B-614B from the binary value records 617B-620B by placing the binary key records 611B-614B (and corresponding offset records 621B-624B) at the beginning of the binary stream/file 628, and by placing the binary value records 617B-620B at the end of the binary stream/file 628 after the binary key records 611B-614B. The offset records 621B-624B allow the run-time engine module 540 to know which binary value record is associated with a particular binary key when the run-time engine module 540 reads one of the binary key records 611B-614B from disk 530.

At load-time, the run-time engine module 540 reads the binary key/value pairs 611B/617B, 612B/618B, 613B/619B, 614B/620B from disk 530.

The object tree for the resource dictionary is obtained from the binary stream 628 stored on the disk 530. At run-time, the run-time engine module 540 interprets the sequential binary data as binary key records 611X-214X and binary value records 617X-620X, and loads the binary records 611B/617B, 612B/618B, 613B/619B, 614B/620B into memory 550. When the binary stream/file 628 is loaded into memory 550, only the binary key records 611B-614B and corresponding offset records 621B-624B are instantiated in memory 550 as key objects 611o-614o and offset objects 623o, 624o which can be understood by a software module. The size of the offset objects 623o, 624o is negligible in comparison to the size of the other records.

The binary value records 617B-620B are instantiated in memory 550 only when the particular or selected ones of the binary value records 617B-620B are requested by the application 560. When a particular binary value record is requested by the application 560, the offset record corresponding to that particular binary value record is replaced with that particular binary value record. The particular binary value record is then instantiated in memory 550 as a value object 617o, 618o.

The deferrable content record 626B designates the binary value records 617B-620B as being deferrable content, and specifies the offset to the end of the binary stream 628. This deferrable content record 626B allows the run-time engine module 540 to avoid loading binary value records 617B-620B when the RD 514 is loaded by telling the run-time engine module 540 how far to skip ahead to reach the end of the RD 514. Consequently, at run-time when the RD 514 is loaded into memory 550, the run-time engine module 540 loads only the key record/offset record pairs 611B/621B, 612B/622B, 613B/623B, 614B/624B into memory 550 and skips to the end of the binary stream 628 bypassing the binary value records 617B-620B (and continues loading the other elements).

The example shown in FIG. 6 assumes that only binary value records 617B and 618B have been requested by the application module 560. As such, when binary value records 617B, 618B were requested, the offset records 621B, 622B corresponding to binary value records 617B, 618B are replaced with those particular binary value records 617B, 618B. The particular binary value records 617B, 618B can then be instantiated in memory 550 as value objects 617o, 618o. As such, only the items in the resource dictionary that are currently needed are instantiated. Because fewer items tend to be instantiated in an application, startup time and memory usage can be improved. For example, in contrast to the techniques implemented in FIGS. 1-3, the memory saved block 626 demonstrates that this technique can save a substantial amount of the memory 550 by delaying the loading and instantiation of binary value records 619B, 620B. For binary value records 619B, 620B which are not used or requested by the application module 560, only key objects 613o, 614o and offset objects 623o, 624o are instantiated. This saves space in memory 550 which would otherwise be occupied by binary value objects corresponding to binary value records 619B, 620B according to techniques. Moreover, the time required to load those objects can also be eliminated.

Figure 7:
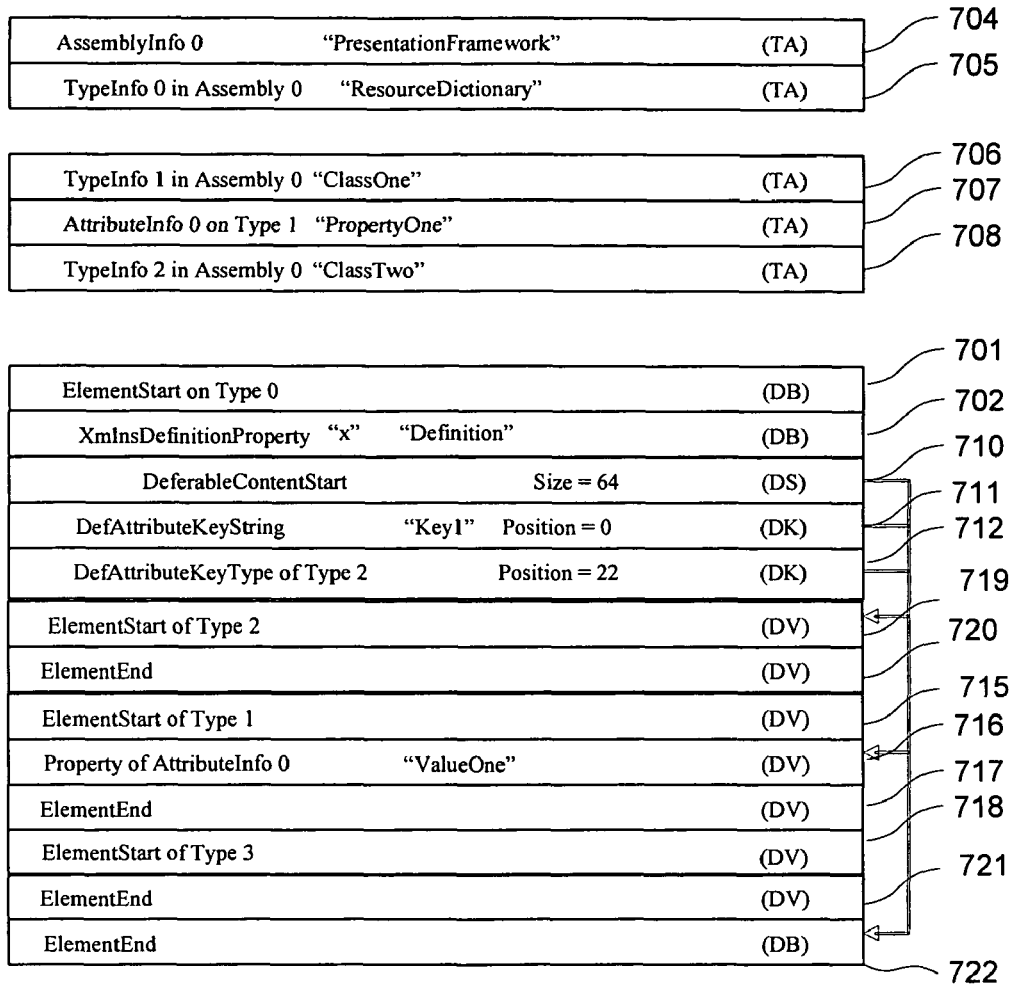
FIG. 7 shows an example of binary records stored in a binary representation of the XAML file/stream according to an exemplary implementation.

FIG. 7 shows an example of binary records 702-722 of a typical binary representation of the XAML file/stream 700 according to an exemplary implementation. As shown, in addition to dictionary key (DK) information or records 711, 712 and dictionary value (DVs) information or records 715-721, a typical binary file 700 might have a number of other records including type and attribute (TA) information or records 704-708, a defer start (DS) information or record 710, and dictionary element bounds (DB) information or records 701, 702, 722.

The AssemblyInfo record 704 specifies the full name of an assembly "PresentationFramework" that when loaded contains Types used in the construction of an object tree. The TypeInfo records 705, 706, 708 specify the full name of the type of an object, with a reference to the Assembly record where it is defined. For example, the TypeInfo 0 record 705 specifies the full name "ResourceDictionary," the TypeInfo record 1 706 specifies the full name "ClassOne," and the TypeInfo record 2 708 specifies the full name "ClassTwo." The AttributeInfo record 707 specifies the full name of an attribute, or property, on an object, with a reference to the Type record that defines this attribute, and the type record that defines the type of the property. In this example, AttributeInfo record 707 specifies the full name "PropertyOne" on an object, with a reference to the Type 1 record that defines this attribute, and the type record that defines the type of "PropertyOne."

The dictionary element bounds (DB) records 701, 702, 722 are structure records which contain information about the object tree structure, and make references to the info records for specific types and attributes. The ElementStart on Type 0 record 701 indicates the start of a DependencyObject, whereas the ElementEnd record 722 indicates the end of the Dependency Object. The XmlnsDefinitionProperty record 702 specifies information about an xmlns declaration encountered in a XAML file.

The dictionary key (DK) information or records 711, 712 include offset or position information (Position=0, Position=22) indicating which of the dictionary value (DVs) information or records 715-721 in the values section corresponds to a particular dictionary key (DK) information or records 711, 712.

The ElementStart of Type 1 record 715 indicates that an object of type 1 should be instantiated. This is the first value and if Key 1 (711) were queried, this object would be instantiated. The DefAttributeKeyString record 711 defines a string key that, if matched, would lead to instantiating the object defined by beginning at record 715. The Property of AttributeInfo 0 record 716 defines the value (ValueOne) for the property defined in record 707. The ElementEnd record 717 ends the scope defining the object started at 715. The ElementStart of Type 3 record 718 indicates that an element of type 3 should be instantiated. The DefAttributeKeyType of Type 2 record 712 defines the key that, if matched, would lead to instantiating the object starting at record 718. The ElementStart of Type 2 record 719 starts the object and the ElementEnd record 720 ends the object, creating the object that is the key. The ElementEnd record 721 ends the object starting at record 718.

In contrast to the approach shown in FIG. 3, the binary file 700 of this embodiment also includes the defer start (DS) information or record 710 which indicates the start of the section for which loading can be deferred and the total size of the contents within this deferrable section. APIs which can be used to implement the defer start (DS) information or record 710 will be described below with reference to FIG. 8. When the parser module 526 detects the defer start (DS) information or record 710, the parser module 526 signals that loading of the content defined by the defer start (DS) information or record 710 can be deferred. The size information (Size=64) allows the parser to know how far to jump to skip the values section. The offset or position information (Position=0, Position=22) in the dictionary key (DK) information or records 711, 712 indicates which of the dictionary value (DVs) information or records 715-721 (in the values section) corresponds to a particular dictionary key (DK) information or records 711, 712. This allows loading of the value records 715-721 to be delayed. As such, dictionary value (DVs) information or records 715-721 do not require parsing until dictionary value (DVs) information or records 715-721 are actually requested by the application module 560.

Moreover, type and attribute records (TA) 704-708, key records (DK) 711, 712, and value records (DV) 715-721 are arranged or sorted in a particular order which facilitates more efficient reading of data. For example, in the binary file 700 of this implementation, type and attribute (TA) information or records 703, 704, 706-708 and/or dictionary key (DK) information or records 711, 712 are not interleaved with or interposed with dictionary value (DVs) information or records 715-721. Rather, the type and attribute (TA) information or records 703, 704, 706-708, dictionary key (DK) information or records 711, 712, and dictionary value (DVs) information or records 715-721 are arranged/sorted for more efficient reading of data.

To build the binary file 700, when the parser module 526 detects the start tag of the resource dictionary in the binary file 700, it will start buffering type and attribute (TA) information or records 703, 704, 706-708, dictionary key (DK) information or records 711, 712, and dictionary value (DVs) information or records 715-721 into separate buffers. The parser module 526 also generates and stores offset values or "offsets" for locating dictionary value (DVs) information or records 715-721 which correspond to particular dictionary key (DK) information or records 711, 712. When the end tag of the dictionary is reached, the parser module 526 stops buffering, and the binary records can be flushed to the binary stream according to a predetermined order so that the keys, offsets, and values are arranged in the file format shown in FIG. 7. For example, type and attribute (TA) information or records 704-708 can be flushed first. The start tag 701 of the resource dictionary can be flushed second. The defer start (DS) information or record 710 can be flushed third. Each of the dictionary key (DK) information or records 711, 712 can be flushed fourth. The dictionary key (DK) information or records 711, 712 include an offset (labeled "Position") or other indicia as to the relative stream positions of the dictionary value (DVs) information or records 715-721 associated with dictionary key (DK) information or records 711, 712. In this implementation, the stream positions are relative to the start of the values section. A list of dictionary value (DVs) information or records 715-721 can be flushed fifth. An end tag 722 of the stream resource dictionary can be flushed sixth.

FIG. 8 shows Application Programming Interfaces (APIs) 800 used to set deferrable content on a resource dictionary. As used herein, an Application Programming Interface (API) refers to the set of functions software uses to send requests to and retrieve results.

The "internal void SetDeferableContent("801 indicates the method name on ResourceDictionary. The "byte[ ] buffer" 802 specifies an array that is filled with unparsed binary records. This can apply when the parser can not keep the binary stream open, so the data is actually in memory but not read or instantiated.

The "ParserContext context" 806 indicates parser configuration and state data needed to correctly parse the binary records. The "object rootElement" 808 is parser state data, usually the resource dictionary. The "ArrayList keycollection)" 810 indicates a collection of binary key records and the corresponding offsets inside the section containing binary value records.

The "Stream bamlStream" 803 applies when the binary stream can be kept open, and indicates that the data from the binary value records in the binary stream are not read into memory until needed. The "Int64 startPosition" 804 indicates the starting location of the binary value records in the binary stream. This piece of data allows a seek operation to be performed on the stream to get to the beginning of the section. The "Int32 contentSize" 805 indicates the size of the binary value record section so that reading occurs only within the binary value record section and not outside of it.

When the parser module 526 encounters a DeferableContentStart record at runtime, it will read the section containing the binary key records.

The "internal void SetDeferableContent(" 801 indicates the method name on ResourceDictionary. The "ParserContext context" 806 indicates parser configuration and state data needed to correctly parse the binary records. The "ArrayList keycollection)" 810 indicates a collection of binary key records and the corresponding offsets inside the section containing binary value records. The parser module 526 will call SetDeferableContent 801 on the resource dictionary, passing the parser context 806, a collection of keys 810 and a buffer or stream that contains the section containing binary value records. The binary key records can contain offsets relative to the start of the binary value records section and this can be used at runtime to load the binary value records. The parser module 526 will skip this block of binary and will continue after the ElementEnd record.

When a RD lookup is initiated for one of the items that have not yet been read in, the RD will call the parser module 526, giving it the stream or buffer containing the binary value record(s) and an offset into that stream. The parser module 526 will then read the binary value record(s) and create the value object tree and return it. The RD will then return the binary value record(s) to the caller.

Shared and Unshared Resources

Typically resources or RD values in a RD are shared. When a resource or RD value is shared, the same instance of that resource in the RD is used in different locations by different processes. The RD value remains in the binary stream, and the value object will be stored in the RD. Subsequent lookups for that key will return the same object.

However, in some cases RD values are "non-shared" or "unshared." When a resource or RD value is "unshared," each time that resource is requested, a new instance or copy of the resource is created. For example, if the same RD value is used multiple times in the same document, once the RD value has been interpreted and instantiated, then the RD value can not be shared. In this case, a copy of that RD value needs to be made (instead of handing out the same instance of that RD value as would be done with a "shared" resource). If RD value is marked as non-shared, then the RD value is not held by the RD. Each time a request for a non-shared RD value is received, the RD value is re-instantiated (instead of obtaining the non-shared RD value and overwriting the offset). The offset is retained and its value is recalculated. This way, the next time the non-shared RD value is requested the new offset value can be used to obtain the RD value. Each lookup will result in reparsing the binary value section, creating a new object to return. In this way, the dictionary value serves as a factory for creating new objects.

Figure 9:
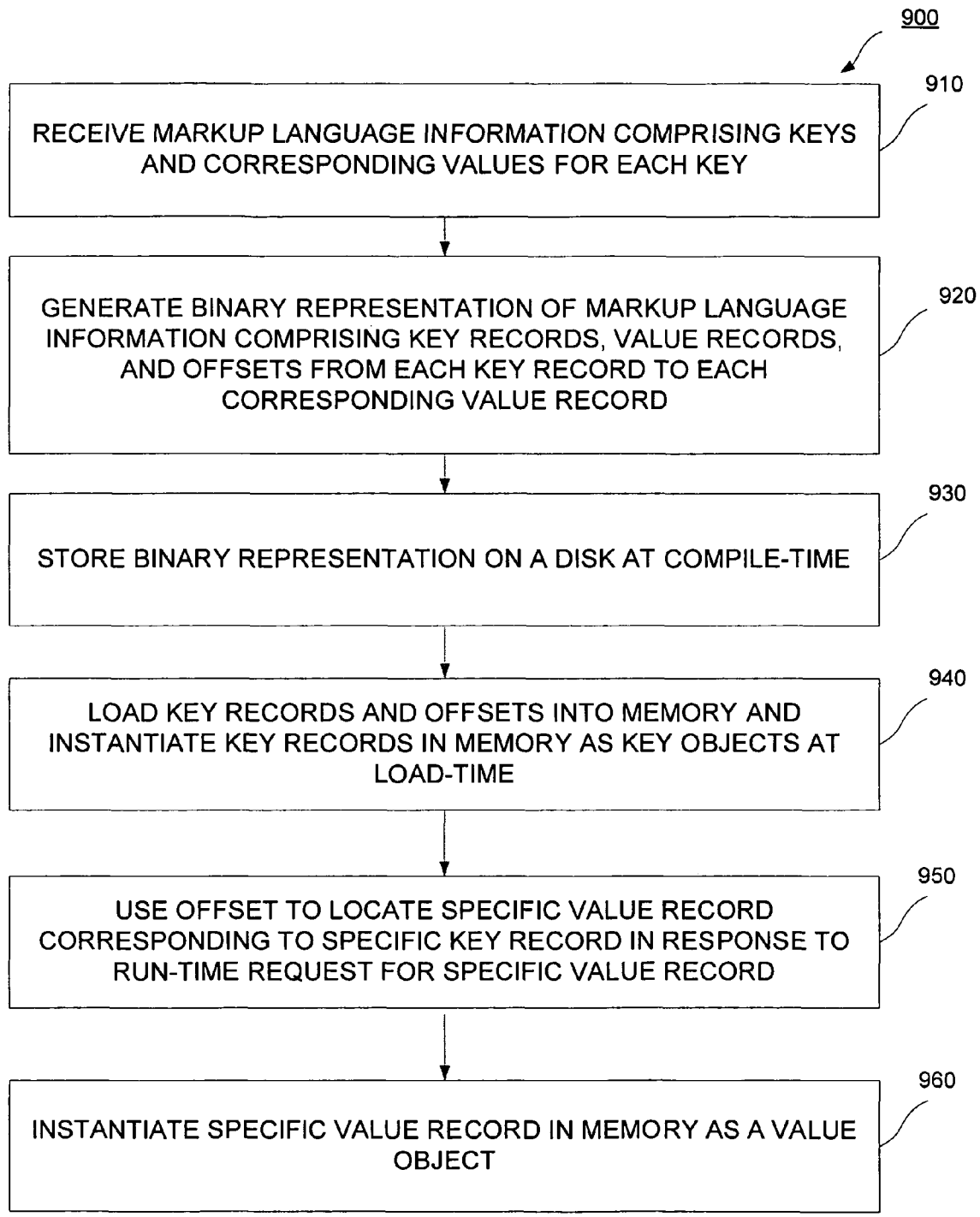
FIG. 9 is a flow chart showing an exemplary method for delayed loading and instantiation of resources in a resource dictionary.

FIG. 9 is a flow chart showing an exemplary technique 900 for delayed loading and instantiation of resources in a RD. These techniques can be applied, for example, in the context of resource management within a UI presentation system. Steps 910 through 930 represent events occurring during a compile-time phase, and steps 940-960 represent events occurring during an instantiation phase that includes a load-time phase and a run-time phase.

At step 910, markup language information is received. The markup language information comprises a plurality of keys and corresponding values for each key. At step 920, using the markup language information, a binary representation of markup language information is generated. The binary representation of markup language information comprises key records, value records and offsets. Each offset can be a number indicating the relative location of each value record in the binary representation of markup language information with respect to its corresponding key record. At step 930, at compile-time, the binary representation of markup language information is stored, for example, on a disk.

At step 940, at load-time, the key records and offsets are loaded into memory. The key records are instantiated in memory as key objects. At step 950, in response to a request for a specific value record, at run-time, a specific value record, corresponding to a specific key record, can be located using the offset associated with the specific key record. At step 960, the specific value record can be instantiated in memory as a value object.

The various illustrative logical blocks, modules, and algorithm steps described in connection with the technique 900 of FIG. 9 may be implemented as computer software modules executed by a processor and have been described above generally in terms of their functionality. A software module may reside in RAM memory, flash memory, ROM memory, EPROM memory, EEPROM memory, registers, hard disk, a removable disk, a CD-ROM, or any other form of storage medium known in the art. An exemplary storage medium can be coupled to the processor such the processor can read information from, and write information to, the storage medium. In the alternative, the storage medium may be integral to the processor. The implementation of this functionality depends upon the particular application and design constraints imposed on the overall system. Skilled artisans may implement the described functionality in varying ways for each particular application, but such implementation decisions should not be interpreted as causing a departure from the scope of the present invention.

The techniques described herein may be embodied as logic instructions on a computer-readable medium implemented in any suitable software or firmware, or may be reduced to hardware. When executed on a processor, the logic instructions cause a general purpose computing device to be programmed as a special-purpose machine that implements the described techniques. The processor, when configured by the logic instructions to execute the techniques recited herein, constitutes structure for performing the described techniques. Generally, various different general purpose or special-purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, network-ready devices, minicomputers, mainframe computers, distributed computing environments that include any of the above systems or devices, and the like.

The functionality of the computers is embodied in many cases by computer-executable instructions, such as software components, that are executed by the computers. Generally, software components include routines, programs, objects, components, data structures, etc. that perform particular tasks or implement particular abstract data types. Tasks might also be performed by remote processing devices that are linked through a communications network. In a distributed computing environment, software components may be located in both local and remote computer storage media.

The instructions and/or software components are stored at different times in the various computer-readable media that are either part of the computer or that can be read by the computer. Programs are distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect" or "coupled to" used in describing or showing a relationship between different elements do not imply that a direct connection must be made between these elements. For example, two elements may be connected to each other electronically, logically, or in any other manner, through one or more additional elements, without departing from the scope of the invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiments and implementations. For instance, while the invention has generally been described in terms of the generation of a binary representation of source XAML which both exist or load on a client machine, in embodiments either of the source XAML, or binary representation and binary tree could, for instance, be distributed locally or remotely, for instance to serve binary representation from a remote server to a client or other machine.

It should also be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein.

What is claimed is:

1. A method, comprising:
receiving a markup language information comprising keys and corresponding values for each key;
using a compiler at compile-time, compiling the markup language information to generate a binary representation of the markup language information, the binary representation comprising key records, value records corresponding to each of the key records, and offsets from each key record to each corresponding value record;
using a run-time engine, instantiating the key records as key objects in a memory at a load-time phase;
in response to a run-time request for a specific value record, locating the specific value record using a specific offset at a run-time phase occurring after the load-time phase; and
instantiating the specific value record as a value object in the memory.

2. The method of claim 1, wherein generating the binary representation of the markup language information, comprises:
receiving a plurality of keys and corresponding values for each key;
buffering the plurality of keys in a first buffer;
buffering the corresponding values for each key in a second buffer; and
arranging the plurality of keys and corresponding values for each key into a format.

3. The method of claim 2, wherein the binary representation of the markup language information is generated based on the markup language information comprising the plurality of keys and the corresponding values for each key.

4. The method of claim 3, wherein the markup language information comprises Extensible Application Markup Language (XAML) information, wherein the format comprises a binary record format, wherein each key record comprises a binary key record, wherein each value record comprises a binary value record, and wherein generating the binary representation of the markup language information, comprises:
buffering the plurality of binary key records in the first buffer;
buffering the corresponding binary value records for each binary key record in the second buffer;
generating offsets from each binary key record to each corresponding binary value record for a location of each binary value record; and
arranging the plurality of binary key records and corresponding binary value records into the binary record format comprising binary key records, binary value records, and offsets from each binary key record to each corresponding binary value record.

5. The method of claim 4, further comprising:
interpreting and loading the binary key records and offsets into the memory at the load-time phase; and
instantiating the binary key records in the memory as key objects.

6. The method of claim 5, wherein locating the specific value record in response to a run-time request, comprises:
locating a specific binary value record in response to the run-time request, wherein the specific binary value record is located using a specific offset corresponding to a specific binary key record associated with the specific binary value record; and
wherein instantiating the specific value record as a value object in the memory, comprises:
instantiating the specific binary value record in the memory as the value object.

7. The method of claim 6, wherein the binary record format comprises:
a first portion comprising a first binary key record, a first offset to a first binary value record, a second binary key record, and a second offset to a second binary value record; and
a second portion comprising the first binary value record and the second binary value record.

8. The method of claim 7, wherein the first offset and the second offset are interposed between the first binary key record and the second binary key record.

9. The method of claim 8, wherein the second portion is arranged such that the first portion precedes the second portion.

10. The method of claim 9, wherein the second portion is instantiated in a resource dictionary after the first portion.

11. The method of claim 7, wherein locating a specific binary value record in response to a run-time request, wherein the specific binary value record is located using a specific offset corresponding to a specific binary key record associated with the specific binary value record, comprises:
locating the first binary value record in response to the run-time request, wherein the first binary value record is located using the first offset corresponding to the first binary key record associated with the first binary value record; and
loading and interpreting the first binary value record, and wherein instantiating the specific binary value record in the memory as the value object in the memory comprises:
instantiating the first binary value record as a first value object in a resource dictionary stored in the memory.

12. A system, comprising:
a parser module configured to compile a markup language information to generate a binary representation of the markup language information comprising key records, value records corresponding to each of the key records, and offsets from each key record to each corresponding value record;
a memory configured to store key objects corresponding to the key records and offset information corresponding to the offsets, wherein the key objects are instantiated in memory at a load-time phase;
a run-time engine configured, in response to a run-time request for a specific value record, to locate a specific value record using a specific offset and to instantiate the specific value record in the memory as a value object at a run-time phase occurring after the load-time phase; and
instantiating the specific value record as a value object in the memory.

13. The system of claim 12, further comprising:
a disk configured to store the binary representation of the markup language information; and
an application module configured to request the specific value record corresponding to the specific key record.

14. The system of claim 13, further comprising:
a compiler module configured to receive markup language information having a first format, the markup language information comprising a plurality of keys and corresponding values for each key,
wherein the parser module is configured to receive the markup language information from the compiler module and to generate the binary representation of the markup language information by performing processing to:

convert the keys into key records and buffer the plurality of key records in a first buffer, convert the values into value records and buffer the corresponding value records for each key record in a second buffer, and arrange the plurality of key records and corresponding value records for each key into a second format different than the first format.

15. The system of claim 14, wherein the markup language information comprises XAML information.

16. The system of claim 12, wherein the second format comprises a binary record format, wherein each key record comprises a binary key record, and wherein each value record comprises a binary value record, and wherein the parser module is configured to generate the binary representation of the markup language information by converting the keys into binary key records and buffering the plurality of binary key records in the first buffer, converting the values into binary value records and buffering the binary value records in the second buffer, generating offsets from each binary key record to each corresponding binary value record for locating each binary value record, and arranging the binary key records and corresponding binary value records for each binary key record into the binary record format, the binary record format comprising binary key records, binary value records, and offsets from each binary key record to each corresponding binary value record.

17. A method of delayed loading of resources defined markup, comprising:

receiving a binary representation of extensible application markup language (XAML) resource information generated at compile time comprising key records, value records corresponding to each of the key records, and offsets from each key record to each corresponding value record, wherein the key records and offsets are stored in a first contiguous portion followed by the value records in a second portion;

using a run-time engine, instantiating the key records in memory as key objects during a load-time phase;

in response to a run-time request for a specific value record, locating a specific value record using a corresponding specific offset at a run-time phase; and instantiating the specific value record in the memory as a value object.

* * * * *